US008460795B2

(12) United States Patent
Anderson et al.

(10) Patent No.: US 8,460,795 B2
(45) Date of Patent: Jun. 11, 2013

(54) CURABLE FILM-FORMING COMPOSITIONS DEMONSTRATING BURNISH RESISTANCE AND LOW GLOSS

(75) Inventors: Lawrence G. Anderson, Allison Park, PA (US); Paul H. Lamers, Allison Park, PA (US); Stephen G. McQuown, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 895 days.

(21) Appl. No.: 12/028,988

(22) Filed: Feb. 11, 2008

(65) Prior Publication Data

US 2008/0255288 A1   Oct. 16, 2008

Related U.S. Application Data

(60) Provisional application No. 60/911,366, filed on Apr. 12, 2007.

(51) Int. Cl.
*C08K 3/10* (2006.01)
*B32B 27/26* (2006.01)

(52) U.S. Cl.
USPC ........... 428/421; 524/413; 524/435; 524/544; 525/199; 525/200

(58) Field of Classification Search
USPC ........................................ 524/435
See application file for complete search history.

(56) References Cited

U.S. PATENT DOCUMENTS

| | | | |
|---|---|---|---|
| 3,716,599 A | 2/1973 | Vasta | |
| 4,581,412 A | 4/1986 | Ohmori | |
| 4,857,620 A | 8/1989 | McCollum | |
| 5,100,962 A | 3/1992 | Sawada | |
| 5,178,915 A | 1/1993 | Moyle | |
| 5,198,498 A | 3/1993 | Valet | |
| 5,216,081 A * | 6/1993 | Mohri et al. | 525/199 |
| 5,342,878 A | 8/1994 | Das | |
| 5,445,850 A | 8/1995 | Das | |
| 5,464,897 A | 11/1995 | Das | |
| 5,602,198 A | 2/1997 | Das | |
| 5,641,829 A | 6/1997 | Das | |
| 5,849,835 A | 12/1998 | Das | |
| 5,939,491 A | 8/1999 | Wilt | |
| 6,040,394 A | 3/2000 | Wilt | |
| 6,046,276 A | 4/2000 | Ambrose | |
| 6,046,296 A | 4/2000 | Wilt | |
| 6,048,934 A | 4/2000 | Wilt | |
| 6,069,221 A | 5/2000 | Chasser | |
| 6,103,824 A | 8/2000 | Wilt | |
| 6,103,838 A | 8/2000 | Wilt | |
| 6,136,928 A | 10/2000 | Wilt | |
| 6,187,863 B1 | 2/2001 | Wilt | |
| 6,225,434 B1 | 5/2001 | Sadvary | |
| 6,274,672 B1 | 8/2001 | Ambrose | |
| 6,376,607 B1 | 4/2002 | Ambrose | |
| 6,387,519 B1 | 5/2002 | Anderson | |
| 6,495,624 B1 * | 12/2002 | Brown | 524/462 |
| 6,534,188 B2 | 3/2003 | Sadvary | |
| 6,541,119 B2 | 4/2003 | Sadvary | |
| 6,593,417 B1 | 7/2003 | Anderson | |
| 6,610,777 B1 | 8/2003 | Anderson | |
| 6,623,791 B2 | 9/2003 | Sadvary | |
| 6,635,341 B1 | 10/2003 | Barancyk | |
| 6,657,001 B1 | 12/2003 | Anderson | |
| 6,759,478 B2 | 7/2004 | Anderson | |
| 6,790,904 B2 * | 9/2004 | White et al. | 524/588 |
| 6,803,408 B2 | 10/2004 | Anderson | |
| 6,987,144 B2 | 1/2006 | Anderson | |
| 7,005,472 B2 | 2/2006 | Anderson | |
| 7,053,149 B2 | 5/2006 | Anderson | |
| 2006/0074195 A1 * | 4/2006 | Coca et al. | 525/326.3 |
| 2006/0188722 A1 | 8/2006 | White | |

FOREIGN PATENT DOCUMENTS

EP   1454970 A1   9/2004
GB   1395432      5/1975

* cited by examiner

*Primary Examiner* — Mark Eashoo
*Assistant Examiner* — Nicole M Buie-Hatcher
(74) *Attorney, Agent, or Firm* — Krisanne Shideler

(57) ABSTRACT

The present invention is directed to curable film-forming compositions comprising:
 a) a curing agent; and
 b) a film-forming material comprising a fluoropolymer, a polymer having functional groups, and a plurality of particles comprising fillers and/or nanoscale particles having an average particle size ranging from 1 to less than 1000 nanometers prior to incorporation into the composition; wherein 20 to 30 percent by weight of the film-forming material of b) comprises the fluoropolymer. In certain embodiments, after application to a substrate as a coating and after curing, the cured composition demonstrates burnish resistance and an 85° gloss of less than 50. Multi-component composite coating compositions are also provided.

12 Claims, No Drawings

CURABLE FILM-FORMING COMPOSITIONS DEMONSTRATING BURNISH RESISTANCE AND LOW GLOSS

CROSS-REFERENCE TO RELATED APPLICATIONS

This application claims the benefit of U.S. Provisional Application Ser. No. 60/911,366, filed Apr. 12, 2007.

STATEMENT REGARDING FEDERALLY SPONSORED RESEARCH OR DEVELOPMENT

This invention was developed with support by the United States Government under agreement number FA8650-05-2-5042 awarded by the Air Force Research Laboratories (AFRL). The United States Government has certain rights in the invention.

FIELD OF THE INVENTION

The present invention relates generally to curable film-forming compositions that demonstrate burnish resistance and low gloss properties.

BACKGROUND OF THE INVENTION

Recently a great deal of research effort in the coatings industry has been focused on mar and abrasion resistance of transparent coatings. While these two terms are often used interchangeably, the physical and mechanistic events are quite different. Mar is a near-surface phenomenon involving small scratches, usually without significant removal of material. Abrasion involves much more severe damage and often entails significant loss of coating material. As such, mar resistance is influenced primarily by surface properties while abrasion resistance is controlled by bulk properties. The chemical attributes that influence these mechanical properties are often divergent. For example, acrylic urethane clearcoats can have excellent abrasion resistance but poor mar resistance. On the other hand, acrylic melamine coatings can have good mar resistance and average to poor abrasion resistance. One common example of mar damage is gloss loss on an automobile finish. The high gloss finish of a new car becomes dull and hazy with time due to fine scratches and abrasions. The majority of this damage is caused by the scrubbing action of cloths or bristles used in automatic car washes. Abrasion damage is more commonly seen in floor coatings, and in its most severe form the substrate may become exposed. Burnishing of highly pigmented coatings is less well defined in the literature but contains elements of mar and abrasion as well as interfacial adhesion. There are at least four different wearing mechanisms that can contribute to burnishing in coatings containing fillers or pigments. 1) Removal of film at the air/surface interface, 2) abstraction of the filler by cohesive binder failure, 3) abstraction of filler by adhesive failure and/or 4) filler wear. Which mechanism predominates may vary depending on the coating, abrasion conditions and outdoor exposure. Ideally a burnish resistant coating has good abrasion resistance, good mar resistance, and pigment particles with excellent compatibility with the binder.

Camouflage aircraft typically utilize low gloss pigmented coatings to achieve many of their performance requirements. These low gloss or matte finishes exhibit physically rough surfaces, which, ideally, diffusely reflect visible light. These physically rough surfaces are difficult to clean and often require scrubbing with an abrasive pad, which over time can increase the uniformity of coating reflectance, called burnishing. The increase in reflection is perceived visually as a color shift resulting in areas of higher contrast. Mechanically, this increase in gloss or burnishing is caused by abrasion of the rough paint surface producing a smoother surface with more uniform reflection.

It would be desirable to develop curable film-forming compositions which can be repeatedly cleaned with detergents and abrasives without increasing the reflectance of the coating.

SUMMARY OF THE INVENTION

The present invention is directed to curable film-forming compositions comprising:
a) a curing agent; and
b) a film-forming material comprising a fluoropolymer, a polymer having functional groups, and a plurality of particles comprising fillers and/or nanoscale particles having an average particle size ranging from 1 to less than 1000 nanometers prior to incorporation into the composition; 20 to 30 percent by weight of the film-forming material of b) comprises the fluoropolymer and after application to a substrate as a coating and after curing, the cured composition demonstrates burnish resistance and an 85° gloss of less than 50.

The present invention is further directed to multi-component composite coating compositions comprising a basecoat deposited from a pigmented film-forming composition which demonstrates an 85° gloss of less than 20, and a transparent topcoat applied over the basecoat in which the transparent topcoat is deposited from a topcoat film-forming composition, the topcoat film-forming composition comprising the curable film-forming compositions described above.

DETAILED DESCRIPTION OF THE INVENTION

It is noted that, as used in this specification and the appended claims, the singular forms "a," "an," and "the" include plural referents unless expressly and unequivocally limited to one referent.

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

The various embodiments and examples of the present invention as presented herein are each understood to be non-limiting with respect to the scope of the invention.

As used in the following description and claims, the following terms have the meanings indicated below:

The terms "acrylic" and "acrylate" are used interchangeably (unless to do so would alter the intended meaning) and include acrylic acids, anhydrides, and derivatives thereof, such as their C1-C5 alkyl esters, lower alkyl-substituted acrylic acids, e.g., C1-C5 substituted acrylic acids, such as methacrylic acid, ethacrylic acid, etc., and their C1-C5 alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The term "burnish resistant" refers to an ability of a coating to maintain its gloss without demonstrating a significant increase (i.e., less than 15 points) in gloss after scrubbing with an abrasive material or pad.

The present invention is directed to curable film-forming compositions. The film-forming compositions generally comprise a curing agent (a). The curing agent (a) may be selected from, for example, aminoplasts, polyisocyanates, including blocked polyisocyanates, polyepoxides, and polyacids. Mixtures of curing agents may also be used.

Useful aminoplast resins are based on the addition products of formaldehyde with an amino- or amido-group carrying substance. Condensation products obtained from the reaction of alcohols and formaldehyde with melamine, urea or benzoguanamine are most common. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol.

The polyisocyanates that may be utilized as curing agents can be prepared from a variety of isocyanate-containing materials. Often, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethylpyrazole.

Alternatively, the curing agent (a) comprises a polyisocyanate having free isocyanate functional groups and the curable film-forming composition is a two-package system. Such compositions are often curable at ambient temperatures. In this embodiment, the curing agent of a) and the film-forming material of b) are provided as separate packages and are mixed together immediately prior to application of the curable film-forming composition to a substrate.

The polyisocyanate may include a single trifunctional polyisocyanate or a mixture of two or more different trifunctional polyisocyanates, and may be selected from one or more polyisocyanates such as triisocyanates including isocyanurates.

Suitable trifunctional isocyanates include, but are not limited to, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, Inc., DESMODUR N 3300, which is the isocyanurate of hexamethylene diisocyanate, and DESMODUR Z 4470, a trimer of isophorone diisocyanate, both available from Bayer Corporation. Specifically used polyisocyanates are cyclic isocyanates, particularly, isocyanurates of diisocyanates such as hexamethylene diisocyanate and isophorone diisocyanate.

The polyisocyanate may also be any of those disclosed above, chain extended with one or more polyamines and/or polyols using suitable materials and techniques known to those skilled in the art.

Urethane coatings are widely known to provide excellent abrasion resistance. Several chemical and mechanistic theories have been proposed to explain this attribute of urethane coatings. For example, high abrasion resistance may be due to a combination of covalent crosslinks and intersegmental hydrogen bonds. Under stress the hydrogen bonds can dissociate and allow for polymer elongation without permanent deformation. Toughness is increased in this scenario due to the work required to dissociate the hydrogen bonds, which can reform without permanent damage to the coating. Percent elongation at break and/or work to break are two common measurements used to describe mechanical toughness, and several studies have related these mechanical properties to wear life in field studies. While the best abrasion resistant coatings are often cured at elevated temperatures, good to excellent abrasion resistance can be realized at ambient temperature cure with the addition of catalysts and other additives. Optimization of final coating properties such as exterior durability, hardness, toughness and transparency is facilitated by a wide variety of commercially available multifunctional isocyanates. In addition to isocyanates, auxiliary crosslinkers may also be employed to optimize coating properties.

Polyepoxides are suitable curing agents for polymers having carboxylic acid groups and/or amine groups. Examples of suitable polyepoxides include low molecular weight polyepoxides such as 3,4-epoxycyclohexyl methyl 3,4-epoxycyclohexanecarboxylate and bis(3,4-epoxy-6-methylcyclohexylmethyl) adipate. Higher molecular weight polyepoxides, including polyglycidyl ethers of polyhydric phenols and alcohols, are also suitable as crosslinking agents.

Polyacids, particularly polycarboxylic acids, are good curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811 at column 6, line 45 to column 9, line 54, which is incorporated herein by reference.

The amount of the curing agent (a) present in the curable film-forming composition of the present invention generally ranges from 10 to 90 percent by weight, or 20 to 80 percent by weight, or 30 to 60 percent by weight, based on the total weight of resin solids (curing agent plus all polymers) in the film-forming composition.

The curable film-forming composition of the present invention further comprises (b) a film-forming material comprising a fluoropolymer, a polymer having functional groups, and a plurality of particles.

The fluoropolymer typically comprises addition polymerization products of ethylenically unsaturated monomers. Suitable fluorine-containing monomers include chlorotrifluoroethylene, vinylidene fluoride, and hexafluoropropylene. Suitable other copolymerizable ethylenically unsaturated monomers include isobutylene, diisobutylene, dipentene, isoprenol, vinyl acetate, vinyl esters, vinyl aromatic compounds such as styrene, a-methyl styrene and vinyl toluene; nitriles such as acrylonitrile and methacrylonitrile; vinyl and vinylidene halides such as vinyl chloride and vinyl ethers and vinyl esters such as vinyl acetate.

In certain embodiments of the present invention, ethylenically unsaturated monomers having hydroxyl functional groups are also used in the preparation of the fluoropolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are used most often. Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl)phenyl glycidyl ether. Preferred glycidyl esters include those of the structure:

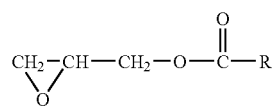

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

In a particular embodiment of the present invention, the fluoropolymer comprises a reaction product of chlorotrifluoroethylene, isobutylene, a vinyl functional monomer comprising a vinyl ether and/or a vinyl ester, and a hydroxyl functional alkyl ester of (meth) acrylic acid.

The amount of the fluoropolymer present in the film-forming material (b) generally ranges from 10 to 90 percent by weight, or 10 to 50 percent by weight, or 20 to 30 percent by weight, based on the total weight of resin solids in the film-forming material (b).

The film-forming material (b) further comprises a polymer having functional groups. The polymer may comprise an acrylic, polyester, polyether polysiloxane and/or polyurethane polymer. Often mixtures of polymers, such as polyester and acrylic polymers, are used. The functional groups are reactive and may comprise, for example, secondary amine, tertiary amine, primary hydroxyl, secondary hydroxyl, carbamate, acid, anhydride, and/or epoxide groups. This polymer system may be used to control performance attributes such as toughness and hardness and may also be used to control the refractive index. Coatings exhibiting a lower refractive index have less front surface reflection or total gloss. For example, decreasing the refractive index of a coating from 1.52 to 1.4 would reduce total front surface reflection by 25%. The refractive index of commonly used coating polymers varies from roughly 1.40 to 1.56. Transparent topcoats used for exterior finishes have refractive indexes in the range of 1.52. In addition to controlling the refractive index, the polymer may also help to control the microstructure of the coating. Coatings with high microstructure appear dull and have reduced gloss values. Microstructure represents surface features <0.3 mm and is an artifact of the binder system, additives and film curing process.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, 2-ethyl hexyl acrylate, isobornyl methacrylate, and cyclohexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include those described above. The acrylic polymer can also be prepared with N-(alkoxymethyl) acrylamides and N-(alkoxymethyl)methacrylamides.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference. Other useful carbamate functional monomers are disclosed in U.S. Pat. No. 5,098,947, which is incorporated herein by reference.

Amine functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of the aqueous coating compositions, or can be prepared via organic solution polymerization techniques with groups capable of salt formation such as acid or amine groups. Upon neutralization of these groups with a base or acid the polymers can be dispersed into aqueous medium. Generally any method of producing such polymers that is known to those skilled in the art utilizing art recognized amounts of monomers can be used.

Besides acrylic polymers, the may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Polyester polymers derived from lactones, such as polycaprolactone, are also suitable. Where it is desired to produce air-drying alkyd resins, suitable drying oil fatty acids may be used and include, for example, those derived from linseed oil, soya bean oil, tall oil, dehydrated castor oil, or tung oil.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups may be incorporated into the polyester or alkyd resin as desired using suitably functional reactants if available, or conversion reactions as necessary to yield the desired functional groups. Such techniques are known to those skilled in the art.

Polyurethanes can also be used as the polymer in the film-forming material (b). Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

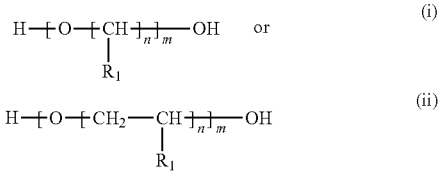

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Pendant carbamate functional groups may be incorporated into the polyethers by a transcarbamoylation reaction. Other functional groups may be incorporated into the polyether as desired using suitably functional reactants if available, or conversion reactions as necessary to yield the desired functional groups.

Suitable epoxy functional polymers for use as the polymer in the film-forming material (b) may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.75 to 1.00:2.00.

The polyepoxide by definition has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl) ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as those disclosed above.

Epoxy functional polymers may alternatively be acrylic polymers prepared with epoxy functional monomers such as glycidyl acrylate, glycidyl methacrylate, allyl glycidyl ether, and methallyl glycidyl ether. Polyesters or polyurethanes prepared with glycidyl alcohols or glycidyl amines, or reacted with an epihalohydrin are also suitable epoxy functional resins.

The amount of the polymer present in the curable film-forming composition generally ranges from 20 to 80 percent by weight, or 40 to 60 percent by weight, based on the total weight of resin solids in the film-forming composition.

The film-forming material (b) further comprises organic or, more often, inorganic particles. Such particles may comprise fillers as discussed below and/or nanoscale particles having an average particle size ranging from 1 to less than 1000 nanometers, or 1 to 100 nanometers, or 1 to less than 50 nanometers, or often 5 to 25 nanometers, prior to incorporation into the coating composition. The nanoscale particles may range between any combination of these values inclusive of the recited values. The particles are typically present in the composition in an amount of 0.01 to 75 percent by weight, often 0.5 to 30 percent by weight, based on the total weight of resin solids in the film-forming composition. It has been found that nano-scale particles in a coating formulation can greatly increase the coating's resistance to repeated marring. Nano-scale particles as used in the compositions of the present invention demonstrate high particle concentration at the coating-air interface. The nano-particles in this area are closely packed and appear as a continuous sheet along the coating surface. It is believed that the closely packed particles reinforce the coating surface against damage during cleaning.

Fillers are widely used in the coatings industry to affect gloss and they are known to improve abrasion resistance in many cases. Fillers control gloss by affecting surface roughness. Fillers should minimize the potential for any refractive index mismatch and have the advantage of excellent coating compatibility. Coating compatibility is important to burnishing resistance since one of the potential failure mechanisms is abstraction of filler by adhesive failure. Fillers can be of any organic or inorganic composition or particle size distribution. Commercially available materials include silica, polyethylene, polypropylene, polyurea, ethylene/acrylic acids solids and waxes. Fillers can be crosslinked or thermoplastic solids or waxes and are available from a variety of commercial sources. Mixtures of organic/inorganic compositions as well as mixture of solids and waxes are can be utilized. Commercially available fillers include ACEMATT from Evonik, CERAFLUOR from Byk Chemie, PERGOPACK from Albemarle and PROPYLMATTE from Micropowders Inc. A variety of fillers/matting agents may be utilized to increase surface roughness and modify the refractive index of the system.

Fillers will be used if needed based on refractive index and microstructure to control the surface reflection. While any filler can be used, two types of fillers may be particularly suitable: soft organic fillers and hard inorganic fillers. Organic fillers may minimize the potential for any refractive index mismatch and have the advantage of excellent coating compatibility. Burnishing resistance may also be improved by the soft elastomeric nature of many of these fillers. One potential drawback to these types of fillers is coating haze, resulting from refractive index mismatches and poor compatibility. Careful attention to size, surface treatments and particle dispersions may be used to overcome this drawback.

Either the filler particles or nanoscale particles can be formed from materials selected from polymeric and nonpolymeric inorganic materials, polymeric and nonpolymeric organic materials, composite materials, and mixtures of any of the foregoing. As used herein, "formed from" denotes open, e.g., "comprising," claim language. As such, it is intended that a composition "formed from" a list of recited components be a composition comprising at least these recited components, and can further comprise other, non-recited components, during the composition's formation. Additionally, as used herein, the term "polymer" in meant to encompass oligomers, and includes without limitation both homopolymers and copolymers.

As used herein, the term "polymeric inorganic material" means a polymeric material having a backbone repeat unit based on an element or elements other than carbon. For more information see James Mark et al., *Inorcianic Polymers*, Prentice Hall Polymer Science and Engineering Series, (1992) at page 5, which is specifically incorporated by reference herein. Moreover, as used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., *Hawley's Condensed Chemical Dictionary*, (12th Ed. 1993) at pages 761-762, and M. Silberberg, Chemistry *The Molecular Nature of Matter and Change* (1996) at page 586.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, *Handbook of Fillers,* 2nd Ed. (1999) at pages 15-202, which are specifically incorporated by reference herein.

The particles suitable for use in the coating compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example boron nitride; specific, nonlimiting examples of metal oxides are, for example zinc oxide; nonlimiting examples of suitable metal sulfides are, for example molybdenum disulfide, tantalum disulfide, tungsten disulfide, and zinc sulfide; nonlimiting suitable examples of metal silicates are, for example aluminum silicates and magnesium silicates such as vermiculite.

The nanoscale particles can comprise, for example a core of essentially a single inorganic oxide such as silica in colloidal, fumed, or amorphous form, alumina or colloidal alumina, magnesium fluoride, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the cured composition of the invention is employed as a transparent topcoat, for example as a clearcoat in a multi-component composite coating composition, particles should not seriously interfere with the optical properties of the cured composition. As used herein, "transparent" means that the cured coating has a BYK Haze index of less than 50 as measured using a BYK/Haze Gloss instrument.

Nonpolymeric, inorganic materials useful in forming the particles used in the compositions of the present invention include inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In certain embodiments, the present invention is directed to compositions containing particles wherein the particles are selected from fumed silica, amorphous silica, colloidal silica, including the type disclosed in the example section of United States Patent Application Publication No. 20060188722 A2, incorporated herein by reference, alumina, colloidal alumina, titanium dioxide, cesium oxide, yttrium oxide, colloidal yttria, zirconia, colloidal zirconia, and mixtures of any of the foregoing. In other embodiments, the present invention is directed to compositions as previously described wherein the particles include colloidal silica. As disclosed above, these materials can be surface treated or untreated.

In certain embodiments, the film-forming material (b) further comprises a polysiloxane, which may be the reaction product of at least the following reactants: (i) at least one polysiloxane of the formula (I):

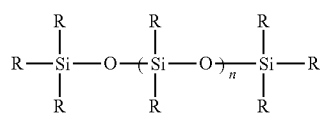

(I)

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, also can range from 0 to 10, and can further range from 0 to 5, such that the percent of SiH content of the polysiloxane ranges from 2 to 50 percent, and can range from 5 to 25 percent; and (ii) at least one molecule which comprises at least one functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group and at least one unsaturated bond capable of undergoing a hydrosilylation reaction. In a specific embodiment, the at least one functional group is selected from primary hydroxyl groups.

It should be appreciated that the various R groups can be the same or different, and, in certain embodiments, the R groups will be entirely monovalent hydrocarbon groups or will be a mixture of different groups such as monovalent hydrocarbon groups and hydroxyl groups.

This reaction product may be ungelled. As used herein, "ungelled" refers to a reaction product that is substantially free of crosslinking and has an intrinsic viscosity when dissolved in a suitable solvent, as determined, for example in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two, such as is commercially available from BASF Corporation as MASILWAX BASE®.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example CARDURA E available from Shell Chemical Co., and mixtures of any of the foregoing.

In certain embodiments, the polysiloxane is a carbamate functional group-containing polysiloxane which comprises the reaction product of at least the following reactants:
(i) at least one polysiloxane containing silicon hydride of structure (I) above where R and n' are as described above for that structure;
(ii) at least one hydroxyl functional group-containing material having one or more unsaturated bonds capable of undergoing hydrosilylation reaction as described above; and
(iii) at least one low molecular weight carbamate functional material, comprising the reaction product of an alcohol or glycol ether and a urea.

Examples of such "low molecular weight carbamate functional material" include, but are not limited to, alkyl carbamate and hexyl carbamates, and glycol ether carbamates described in U.S. Pat. Nos. 5,922,475 and 5,976,701, which are incorporated herein by reference.

The carbamate functional groups can be incorporated into the polysiloxane by reacting the hydroxyl functional group-containing polysiloxane with the low molecular weight carbamate functional material via a "transcarbamoylation" process. The low molecular weight carbamate functional material, which can be derived from an alcohol or glycol ether, can react with free hydroxyl groups of a polysiloxane polyol, that is, material having an average of two or more hydroxyl groups per molecule, yielding a carbamate functional polysiloxane and the original alcohol or glycol ether. Reaction conditions and the ratio of reactants (i), (ii) and (iii) are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the polysiloxane also can be achieved by reacting isocyanic acid with free hydroxyl groups of the polysiloxane.

The film-forming material of b) used in the curable film-forming compositions of the present invention typically demonstrates an index of refraction of less than 1.52, often about 1.4.

Other optional ingredients, such as colorants, catalysts, plasticizers, anti-oxidants, thixotropic agents, hindered amine light stabilizers, UV light absorbers and stabilizers may be formulated into the curable compositions of the present invention. These ingredients may be present (on an individual basis) in amounts up to 10 percent, often from 0.1 to 5 percent by weight based on total weight of resin solids of the film-forming composition. When the composition of the present invention includes aminoplast curing agents, catalysts including acid functional catalysts known to those skilled in the art as useful in aminoplast-cured compositions, such as para-toluenesulfonic acid, dodecylbenzene sulfonic acid, and the like, may be included as well.

The primary role of additives in the present formulations is to increase the coating microstructure. Surface-active additives can be used to affect flow and leveling of the coating surface during cure. In formulations in which they have limited compatibility or are poorly incorporated, surface tension gradients result, which restrict leveling. The resulting coating appearance has excessive microstructure and decreased gloss. In addition, surface structure additives can provide a number of benefits including surface slip, increased durability and application workability.

The coatings of the present invention may include a colorant, although typically they are colorless and transparent. They are also usually optically clear, having a light transmission of at least 70%.

As used herein, the term "colorant" or "chromophore" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable film-forming composition of the present invention, after application to a substrate as a coating and after curing, typically demonstrates burnish resistance and an 85° gloss of less than 80, often less than 50, more often less than 20.

The curable film-forming compositions of the present invention may be curable at ambient temperatures or elevated temperatures, depending on the crosslinking chemistry employed. The film-forming compositions of the present invention alternatively may be used as automotive primers, electrodepositable primers, base coats, clear coats, and monocoats, as well as in industrial and other applications. They are most suitable as topcoats, in particular, clear coats in a multi-layer composite coating composition, such as a color-plus-clear composite coating, as noted below, and monocoats. The compositions may be easily prepared by simple mixing of the ingredients, using formulation techniques well known in the art.

In certain embodiments of the present invention, a multi-component composite coating composition is provided, comprising a basecoat deposited from a pigmented film-forming composition which demonstrates an 85° gloss of less than 20, often less than 10, and a transparent topcoat applied over the basecoat in which the transparent topcoat is deposited from a topcoat film-forming composition, the topcoat film-forming composition comprising any of those described above. Such compositions have particular advantages as coatings for aircraft, particularly military aircraft.

The compositions of the present invention may be applied over any of a variety of substrates such as metallic, glass, wood, and/or polymeric substrates, and can be applied by conventional means including but not limited to brushing, dipping, flow coating, spraying and the like. They are often applied by spraying. The usual spray techniques and equipment for air spraying, airless spraying, and electrostatic spraying employing manual and/or automatic methods can be used. Suitable substrates include but are not limited to metal substrates such as ferrous metals, zinc, copper, magnesium, aluminum, aluminum alloys, and other metal and alloy substrates typically used in the manufacture of automobile, aircraft, and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GAL-VANNEAL, and combinations thereof. Combinations or composites of ferrous and non-ferrous metals can also be used.

The compositions of the present invention may also be applied over elastomeric or plastic substrates such as those that are found on motor vehicles. By "plastic" is meant any of the common thermoplastic or thermosetting synthetic non-conductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

In certain embodiments, the present invention is directed to multi-component composite coating compositions comprising a basecoat deposited from a pigment-containing base coating composition, which can comprise any of the aforementioned curable coating compositions, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above. It should be understood that one or both of the base coating composition and the top coating composition can be formed from the curable coating compositions of the present invention.

Where the basecoat is not formed from a composition of the present invention (but the topcoat is formed from a curable coating composition of the present invention) the coating composition of the basecoat in the color-plus-clear system can be any composition useful in coatings applications, such as automotive applications. The coating composition of the basecoat can comprise a resinous binder and a pigment and/or other colorant, as well as optional additives well known in the art of coating compositions. Nonlimiting examples of resinous binders are acrylic polymers, polyesters, alkyds, and polyurethanes.

In particular embodiments of the present invention, such as for military applications, the base coat typically comprises a composition that demonstrates an 85° gloss of less than 20, typically less than 10, after application to a substrate and after curing. Suitable compositions include those meeting the requirements of Mil-Prf-85285D type I Class H.

The basecoat compositions can be applied to any of the substrates described above by any conventional coating techniques such as those described above, but are most often applied by spraying. The usual spray techniques and equipment for air spraying, airless spray, and electrostatic spraying employing either manual or automatic methods can be used. Resultant film thicknesses may vary as desired.

After forming a film of the basecoat on the substrate, the basecoat can be cured or alternatively given a drying step in which at least some of the solvent is driven out of the basecoat film by heating or an air drying period before application of the clearcoat. Suitable drying conditions may depend, for example, on the particular basecoat composition, and on the ambient humidity if the composition is water-borne.

The transparent or clear topcoat composition can be applied to the basecoat by any conventional coating technique, including, but not limited to, any of those disclosed above. In order to minimize gloss and maximize burnish resistance, the clear topcoat is often applied to the base coat layer as a conformal coating, providing a very thin dry film thickness. Spin coating, flow coating or ultrasonic spray are often the application methods used, in order to yield a dry film thickness of less than 10 microns, such as 7 microns or less, or 5 microns or less, or 3 microns or less, or 2 microns or less. In embodiments where the topcoat comprises filler particles, the dry film thickness may be increased without a significant increase in gloss. The transparent topcoat can be applied to a cured or to a dried basecoat before the basecoat has been cured. In the latter instance, the two coatings can then be heated to cure both coating layers simultaneously.

Typically, after forming the topcoat over the basecoat, the topcoat is given a drying step in which at least some solvent is driven out of the film by heating or, alternatively, an air drying period or curing, which may occur at ambient or elevated temperatures. Suitable drying conditions will depend on the particular film-forming compositions used.

The multi-component composite coating composition of the present invention, after application to a substrate and after curing, typically demonstrates burnish resistance and an 85° gloss of less than 80, often less than 50, more often less than 30.

The present invention is more particularly described in the following examples, which are intended to be illustrative only, since numerous modifications and variations therein will be apparent to those skilled in the art. Unless otherwise specified, all parts and percentages are by weight.

Example A demonstrates a coated panel with only a base coat, with no top coat applied thereon, as a control.

Example 1

In a 500 ml round bottom flask was add 50 g of SUNCOLLOID MFS-10P[1] and 150 g of CAPA 4101[2]. The resulting mix was concentrated on a roto evaporator under reduced pressure for approx 2 hours. The resulting clear solution measured 97% solids after 1 hour at 110° C.

[1] Available from Nissan Chemicals
[2] Available from Solvay

Example 2

|       | Raw Material | Amount (g) |
|-------|--------------|------------|
| Chg 1 | Methylamyl ketone | 200 |
| Chg 2 | LUPEROX 575, available from Arkema, Inc. | 34.2 |
|       | Methylamyl ketone | 50 |
| Chg 3 | Cylcohexene oxide | 8.8 |
|       | Vinyl acetate | 412.8 |
|       | Hydroxyethyl acrylate | 259.9 |
| Chg 4 | Chlorotrifluoroethylene | 456.7 |

To a four liter stainless steel pressure rated reactor was added Chg 1. A 5 PSIG nitrogen pad was applied and the vessel was heated to 110° C. Charges 2, 3, & 4 were prepared in separate pressure rated stainless steel addition tanks. When the reactor reached 110° C., the addition of Chg 2-4 was begun simultaneously and continued for a total of 2 hours. During this time, the internal pressure reached a maximum of 135 PSI. After the additions were complete, the reaction mixture was held at 110° C. for an additional 2 hours. The reaction mixture was then cooled to 60° C. and carefully vented to relieve the pressure. Vacuum was applied to remove any dissolved but unreacted chlorotrifluoroethylene. The reaction product was filtered through a 5☐ bag and had a solids content of 80%, a Gardner-Holdt viscosity of Z6+ and a slightly hazy appearance.

Example 3

The following materials were combined and mixed well.

| Dibutyltindilaurate | 3 g |
| Acetylacetone | 7 g |
| Ethyl Acetate | 10 g |
| Methyl amyl Ketone | 80 g |

| | | Weight in grams | | | | | |
|---|---|---|---|---|---|---|---|
| Source | Description | B | C | D | E | F | G |
| Part A | | | | | | | |
| Solvay | CAPA 4101 polymeric polyol | | | 1 | | | |
| BASF | JONCRYL 910 acrylic resin | | | | | 0.89 | |
| Example 1 | CAPA 4101 w/10% SUNCOLLOID MFS nanoparticle sol | | | | 1.03 | 1.05 | |
| Example 2 | Fluoro Resin | | | 0.83 | 0.78 | | 4.59 |
| PPG Industries | Nanosilica dispersion | | | | | | 7.46 |
| PPG Industries | CA8800Z Activator | 2.55 | 2.55 | | | | |
| Example 3 | 3% Dibutyltindilaurate | | | 0.1 | 0.1 | 0.10 | 0.45 |
| | Methyl amyl Ketone | | | 4.06 | 4.14 | 4.04 | 18.56 |
| | Butyl Acetate | | | 1.31 | 1.44 | 1.48 | 7.86 |
| Sanduvor | HOSTAVIN 3055 hindered amine light stabilizer | | | | | | 0.10 |
| Cytec Industries | CYASORB UV-1164L UV light absorber | | | | | | 0.15 |
| PPG Industries | CA8800F Thinner | 2.45 | 7.35 | | | | |

-continued

| Source | Description | Weight in grams | | | | | |
|---|---|---|---|---|---|---|---|
| | | B | C | D | E | F | G |
| Part B | | | | | | | |
| PPG Industries | CA8800/B900 Base | 5 | 5 | | | | |
| Bayer | 67% DES N 3300 A/33% DES Z 4470 BA polyisocyanate resin | | | 2.7 | 2.52 | 2.46 | 10.83 |

Basecoat

A commercial coating meeting the requirements of Mil-Prf-85285D type I Class H was hand sprayed on unpolished Cold Roll Steel Panels with ED6061 black electrodeposited coating available from ACT laboratories as per the specification and manufacturer's recommendations. The coating target dry film thickness was 2-3 mils and was allowed to dry at ambient temperature for 2 weeks before topcoating. 85° gloss and color were measured.

Topcoat

Clearcoats B-G were prepared by combining materials for Parts A and B in separate containers. After thorough mixing the two parts combined with mixing and the coating applied to the basecoat within 1 hour. Example C was applied by a #10 draw down bar. Examples D-G were applied spin coating for 8 minutes at 2500 rpm. Target dry film thickness was less than 5 microns. All coatings were allowed to dry at ambient temperature before burnish resistance testing.

Burnishing resistance was determined by measuring the 85° gloss of panels before and after mechanical scrubbing with an abrasive pad. Samples with a low difference between these two measurements were considered to have good burnish resistance. The mechanical scrubbing was performed on a Gardner Straight Line Washability and Abrasion Machine with a 2½"×4" metal holder. The apparatus is such that a motor imparts a reciprocating motion to an abrasive pad, attached to the metal holder, widthwise across a test panel clamped to a base plate. Test samples were attached to a base plate underneath the metal holder with double sided tape. Scotch Brite 7448 abrasive pads were cut to measure 2.5"×4" and attached to the metal holder with double sided tape and then moistened with 2 ml of deionized water. A five hundred gram load was attached to the top of the metal holder and the sample subjected to 50 scrubbing cycles of the abrasive pad.

Gloss Measurements

85° gloss measurements were obtained with a micro-Tri gloss 85° gloss meter, available from Byk Gardner. The reported reading was obtained by averaging three readings for each sample.

Burnishing

| Example | Topcoat Dry film thickness, microns | Appearance | Initial 85° Gloss | Burnished 85° Gloss |
|---|---|---|---|---|
| A | 0 | Clear | 10 | 41 |
| B | 43 | Clear | 100 | 91 |
| C | <5 | Clear | 46 | 49 |
| D | <5 | Clear | 23 | 31 |
| E | <5 | Clear | 18 | 31 |
| F | <5 | Clear | 58 | 60 |
| G | <5 | Clear | 19 | 32 |

Example A is a control. Comparative Example B demonstrates the importance of dry film thickness of the topcoat in the multi-component composite coating composition of the present invention. Examples C and F are comparative in that they contain no fluoropolymer. Example D is comparative in that it contains no particles.

The present invention has been described with reference to specific details of particular embodiments thereof. It is not intended that such details be regarded as limitations upon the scope of the invention except insofar as and to the extent that they are included in the accompanying claims.

We claim:

1. A multi-component composite coating composition comprising a basecoat deposited from a pigmented film-forming composition which demonstrates an 85° gloss of less than 20, and a transparent topcoat applied over the basecoat in which the transparent topcoat is deposited from a topcoat film-forming composition, the topcoat film-forming composition comprising:
   a) a curing agent; and
   b) a film-forming material comprising a fluoropolymer, a polymer having functional groups, and a plurality of particles comprising nanoscale particles having an average particle size ranging from 1 to 100 nanometers prior to incorporation into the topcoat film-forming composition;
   wherein 20 to 30 percent by weight of the film-forming material of b) comprises the fluoropolymer, the film-forming material of b) demonstrates an index of refraction of less than 1.52, and wherein after application to a substrate as a coating and after curing, the particles are concentrated at the coating-air interface and appear as a continuous sheet along the coating surface, and wherein the cured composition is transparent and demonstrates burnish resistance and an 85° gloss of less than 50.

2. The multi-component composite coating composition of claim 1, wherein the curing agent of a) comprises a trimer of isophorone diisocyanate and/or a trimer of hexamethylene diisocyanate.

3. The multi-component composite coating composition of claim 1, wherein the fluoropolymer comprises a reaction product of chlorotrifluoroethylene, isobutylene, a vinyl functional monomer comprising a vinyl ether and/or a vinyl ester, and a hydroxyl functional alkyl ester of (meth) acrylic acid.

4. The multi-component composite coating composition of claim 1, wherein the polymer in the film-forming material of b) comprises an acrylic, polyester, polyether and/or polyurethane polymer.

5. The multi-component composite coating composition of claim 1, wherein the functional groups are reactive and comprise secondary amine, tertiary amine, primary hydroxyl, secondary hydroxyl, carbamate, acid, anhydride, and/or epoxide groups.

6. The multi-component composite coating composition according to claim 1, wherein the nanoscale particles have an average particle size ranging from 1 to less than 50 nanometers prior to incorporation into the topcoat film-forming composition.

7. The multi-component composite coating composition according to claim 1, wherein the nanoscale particles comprise fumed silica, amorphous silica, colloidal silica, alumina, colloidal alumina, magnesium fluoride, titanium dioxide, cesium oxide, yttrium oxide, colloidal yttria, zirconia, and/or colloidal zirconia.

8. The multi-component composite coating composition of claim 1, wherein the transparent topcoat demonstrates an 85° gloss of less than 20.

9. The multi-component composite coating composition of claim 1, wherein the basecoat demonstrates an 85° gloss of less than 10.

10. The multi-component composite coating composition of claim 1, wherein the topcoat film-forming composition is curable at ambient temperature.

11. The multi-component composite coating composition of claim 1, wherein the transparent topcoat has a dry film thickness of less than 10 microns.

12. The multi-component composite coating composition of claim 1, wherein the plurality of particles further comprises fillers that increase surface roughness of the cured composition.

* * * * *